(12) United States Patent
Corradi

(10) Patent No.: US 8,752,566 B2
(45) Date of Patent: Jun. 17, 2014

(54) METHOD FOR ROTARY VALVE OPERATION TO REDUCE SEAL SHEET WEAR

(75) Inventor: Jason T. Corradi, Arlington Heights, IL (US)

(73) Assignee: UOP LLC, Des Plaines, IL (US)

(*) Notice: Subject to any disclaimer, the term of this patent is extended or adjusted under 35 U.S.C. 154(b) by 197 days.

(21) Appl. No.: 13/410,968

(22) Filed: Mar. 2, 2012

(65) Prior Publication Data

US 2013/0228712 A1 Sep. 5, 2013

(51) Int. Cl.
| | |
|---|---|
| *F17D 3/00* | (2006.01) |
| *F16K 3/18* | (2006.01) |
| *F16K 11/074* | (2006.01) |
| *B01D 53/047* | (2006.01) |

(52) U.S. Cl.
CPC ............ *F16K 3/188* (2013.01); *F16K 11/0743* (2013.01); *B01D 53/047* (2013.01)
USPC ................... 137/1; 137/625.15; 137/625.46; 251/175; 251/188

(58) Field of Classification Search
CPC .... F16K 3/188; F16K 11/0743; B01D 53/047
USPC .......... 137/487.5, 625.11, 625.15, 625.46, 1; 251/129.04, 157, 158, 160, 161, 170, 251/172, 175, 187, 188
See application file for complete search history.

(56) References Cited

U.S. PATENT DOCUMENTS

| | | | | |
|---|---|---|---|---|
| 3,040,777 | A * | 6/1962 | Carson et al. | ............ 137/625.15 |
| 4,469,494 | A * | 9/1984 | van Weenen | .................... 96/124 |
| 4,614,204 | A * | 9/1986 | Dolejs | ....................... 137/625.11 |
| 4,905,727 | A | 3/1990 | Gavrilla | |
| 4,966,183 | A | 10/1990 | Williamson, Jr. | |
| 5,040,569 | A * | 8/1991 | Nogami et al. | .......... 137/625.65 |
| 5,257,640 | A | 11/1993 | Delajoud | |
| 5,390,805 | A | 2/1995 | Bilani et al. | |
| 6,209,577 | B1 | 4/2001 | Lai et al. | |
| 6,537,451 | B1 * | 3/2003 | Hotier | ........................ 210/198.2 |
| 8,262,783 | B2 * | 9/2012 | Stoner et al. | ..................... 96/108 |
| 2008/0099069 | A1 * | 5/2008 | Cook | .............................. 137/14 |
| 2009/0269634 | A1 | 10/2009 | Fabian et al. | |
| 2010/0089241 | A1 * | 4/2010 | Stoner et al. | ..................... 96/125 |
| 2011/0197769 | A1 * | 8/2011 | Acker et al. | ..................... 96/110 |
| 2013/0233698 | A1 * | 9/2013 | Corradi et al. | ................... 203/41 |

* cited by examiner

*Primary Examiner* — John Rivell
*Assistant Examiner* — Matthew W Jellett
(74) *Attorney, Agent, or Firm* — Mark R Willis

(57) ABSTRACT

A method of operating a rotary valve using a variable dome seating pressure to provide a minimum seating force for each position of the valve is described.

20 Claims, 5 Drawing Sheets

METHOD FOR ROTARY VALVE OPERATION TO REDUCE SEAL SHEET WEAR

FIELD OF THE INVENTION

The invention relates generally to a selective adsorption process, and more particularly to a method of operating an adsorption process to reduce wear on the rotor plate seal sheet for a rotary valve.

BACKGROUND OF THE INVENTION

One method of separating a component or group of components from a mixture is selective adsorption on a solid adsorbent. One example of an adsorption process involves a continuous process in which feed and products enter and leave the adsorbent bed at substantially constant composition. The process simulates the countercurrent flow of a liquid feed over a solid bed of adsorbent without physically moving the solid by moving the injection and withdrawal points along the bed. As the concentration profile moves down the column, the injection and withdrawal points also move. The adsorbent-desorbent combination depends on the materials being separated.

FIG. 1 illustrates an example of an adsorption process. Separation occurs in the adsorbent chamber 10. The adsorbent chamber 10 is separated into a number of beds each of which has a flow distributor connected to the rotary valve 15. The flow distributors inject or withdraw liquid from the adsorbent chamber, or redistribute liquid around the chamber. There are four major streams distributed to and from the adsorbent chamber 10 by the rotary valve 15. The feed inlet stream 20 includes a raw mixture of all of the feed components. A dilute extract out stream 25 includes a selectively adsorbed component or components diluted with desorbent. The dilute raffinate out stream 30 includes rejected components diluted with desorbent. The desorbent in stream 35 is the recycled desorbent separated from the extract and raffinate. Only four of the bed lines are carrying streams into or out of the adsorbent chamber 10 at any given time.

A pumparound pump 40 circulates process liquid from the adsorbent bed at the bottom of the adsorbent chamber 10 to the bed at the top. The concentration profile in the adsorbent chamber 10 moves down past the last bed, through the pumparound pump 40 and up to the top. The actual liquid flow rate through the zones is different because the rate of injection and withdrawal of the streams is different. The overall liquid circulation is controlled by the pumparound pump 40 and a flow control valve (not shown).

The dilute extract stream 45 from the rotary valve 15 is sent to an extract column 50 where an extract stream 55 is separated from a desorbent stream 60. The extract stream 55 is then recovered. The desorbent stream 60 is recycled to the rotary valve 15 for use in the process. The dilute raffinate stream 70 is sent to a raffinate column 75 where a raffinate stream 80 is separated from a desorbent stream 85. The desorbent stream 85 is combined with the desorbent stream 60 and recycled to the process. The raffinate stream 80 is removed. A feed stream 90 is sent to the rotary valve 15 for use in the process.

The rotary valve and its operation are described in U.S. Pat. Nos. 3,040,777 and 3,422,848, for example, which are incorporated herein by reference. The rotary valve includes two main parts: a moving rotor plate and a stationary track plate. The rotor plate sits on top of the track plate, and both are positioned in a pressure containing vessel, commonly called a dome. An elastomer seal sheet is secured to the bottom of the rotor plate between the tracks. In normal operation, the rotor plate is hydraulically seated on the track plate by introducing desorbent flow, or dome sealant, into the liquid filled dome. The dome pressure is maintained at a constant pressure during the entire rotary valve cycle, and that constant pressure is always higher than the highest pressure in the tracks below the rotor plate. The dome set pressure is based on the highest seating pressure needed for all of the positions of the rotor plate. Over time, the movement of the rotor plate causes the seal sheet to wear, which can lead to loss of performance and equipment damage.

SUMMARY OF THE INVENTION

One aspect of the invention is a method of operating a rotary valve. In one embodiment, the method includes selecting a seating force. The pressure of each track in a stationary track plate is measured at a first position of a plurality of positions of a moving rotor plate. The pressure on a seal sheet is controlled at the first position based on the measured pressure at the first position and the seating force. The rotor plate is indexed to the next position, and the pressure of each track in the stationary track plate is measured at the next position. The pressure on the seal sheet is controlled at the next position based on the measured pressure at the next position and the seating force.

DETAILED DESCRIPTION OF THE INVENTION

The present invention provides a method of operating the rotary valve which could extend the life of the seal sheet by using a variable dome seating pressure. The rotary valve is operated at a constant seating force, rather than at a constant dome pressure as in the prior art. Operation at a constant seating force is desired because the seating force relates to seal sheet wear. However, the seating force cannot be measured directly. Consequently, measured pressures must be used to establish the constant seating force. The variable dome pressure setting provides the minimum seating force relative to the operating pressures in the rotary valve tracks for all of the positions of the rotary valve.

The actual pressure is measured by pressure sensors at the external rotary valve track inlet or outlet nozzles. The pressure sensors can transmit the pressure measurements to a controller. The pressure measurements can be used with the known rotary valve track dimensions to establish the force on the bottom of the rotor plate. The force above the rotor plate can be calculated using the dome pressure and the exposed rotor plate area inside the dome, which is fixed. The seating force is the force above the rotor plate minus the force on the bottom of the rotor plate. A desired seating force can be selected. The fixed seating force target can be maintained by adjusting the rotary valve dome pressure in response to the pressure measured in the various tracks at different positions of the rotary valve. Continuously updating the rotary valve dome pressure set point would limit the seating pressure to the minimum required at each position, and reduce seal sheet wear.

The static load of the rotor plate due to gravity is not considered a significant term in establishing the seating force, and so is not included in the calculation. However, it could be included if desired.

In addition, a seating index, defined as the average rotary valve dome pressure during a complete rotary valve cycle (the stepwise rotation of the moving rotor plate through all positions) divided by the average rotary valve track pressure during the same cycle, would allow comparisons of rotary valve seal sheet wear from different units. Currently, comparisons are based on rotary valve dome pressure data, which does not accurately reflect the severity of the operation because the operating pressures of the rotary valve tracks are not known.

Figure 1:
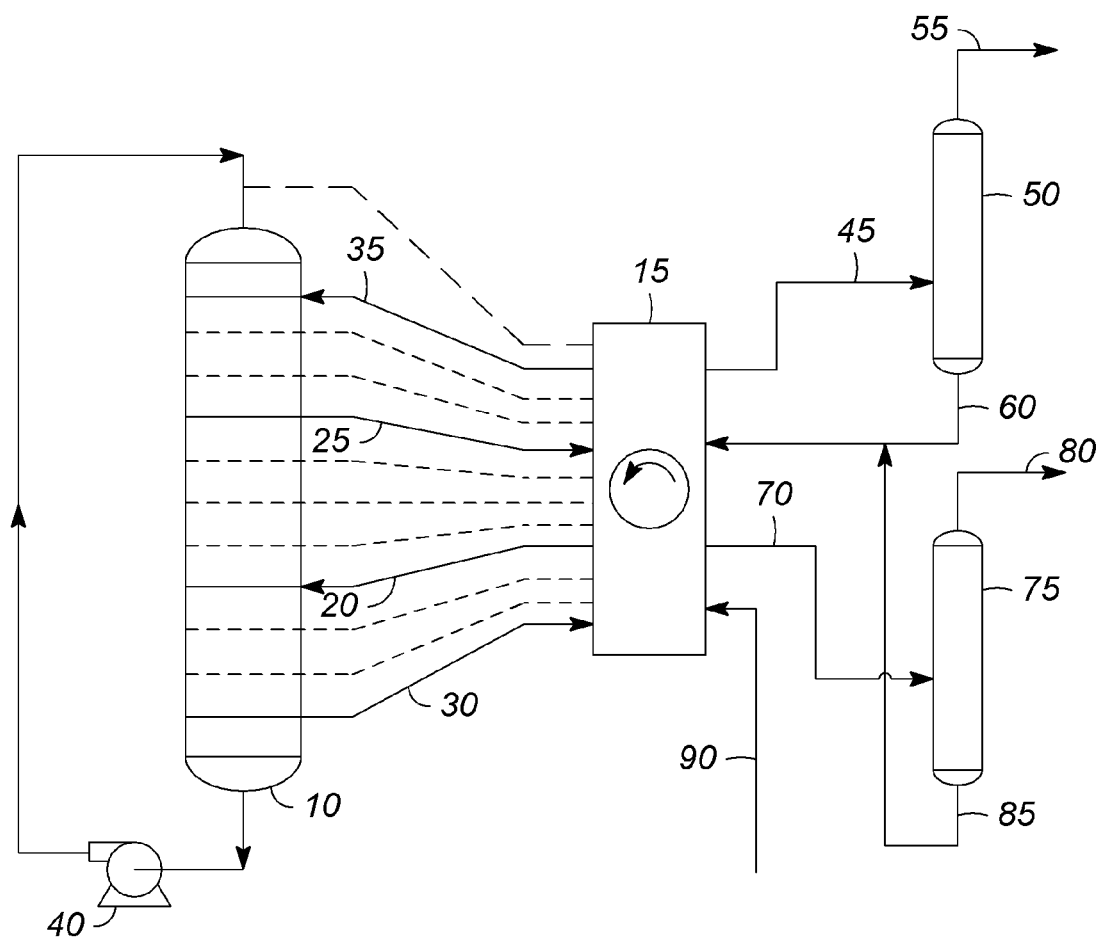
FIG. 1 is an illustration of one embodiment of an adsorption process.
Figure 2:
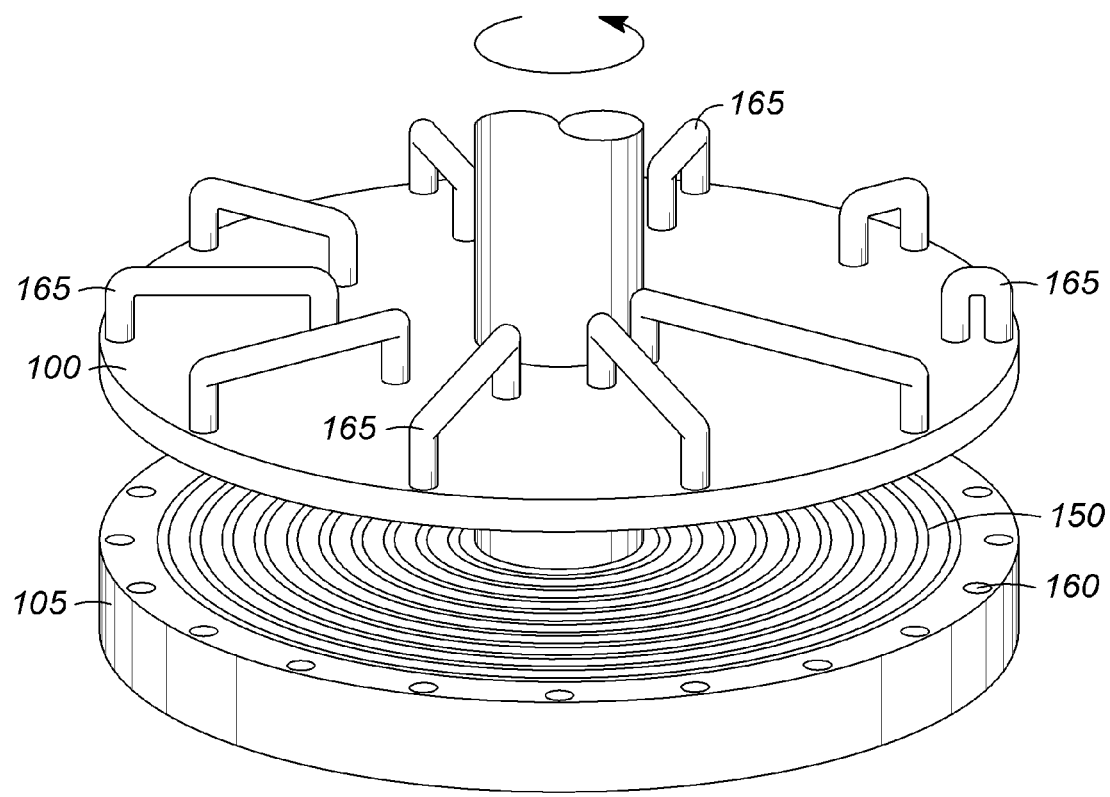
FIG. 2 is an illustration of one embodiment of the track plate and rotor plate.
Figure 3:
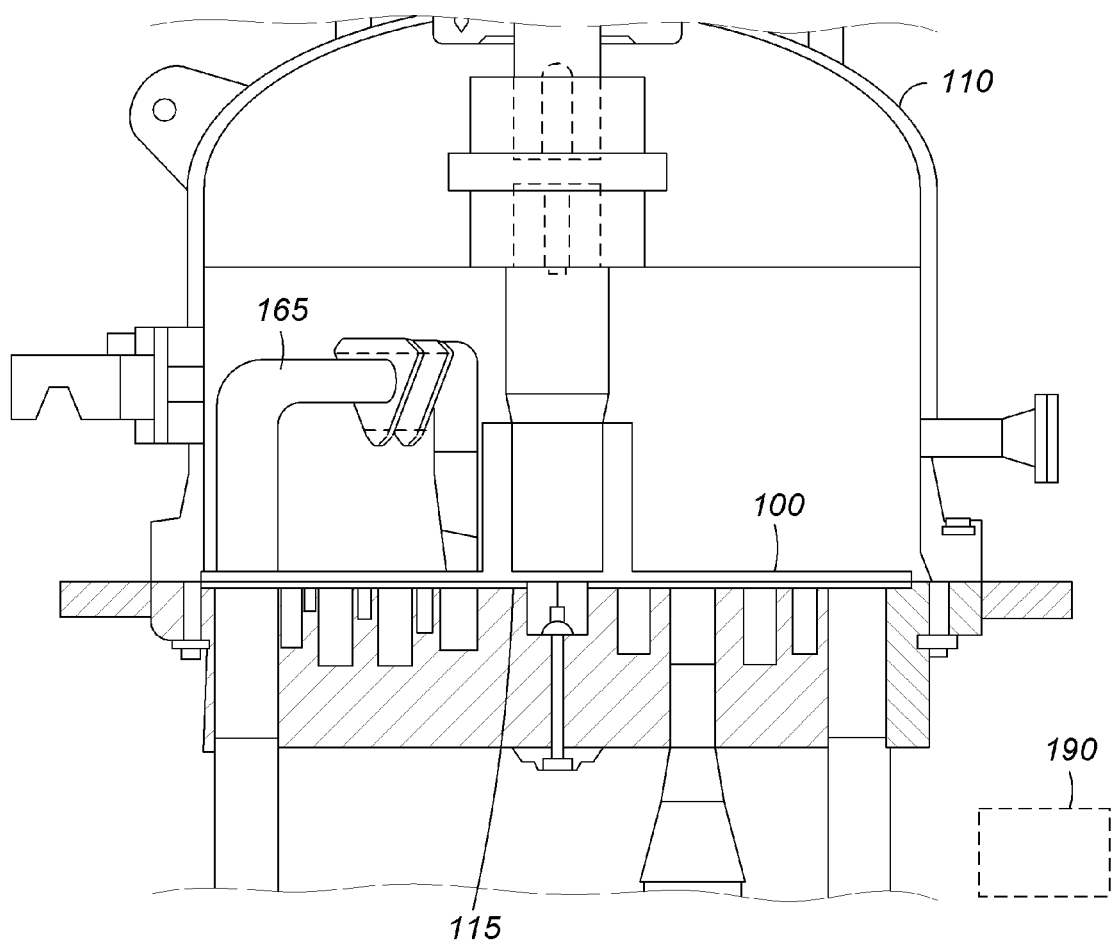
FIG. 3 is an illustration of one embodiment of an assembled rotary valve.
Figure 4:
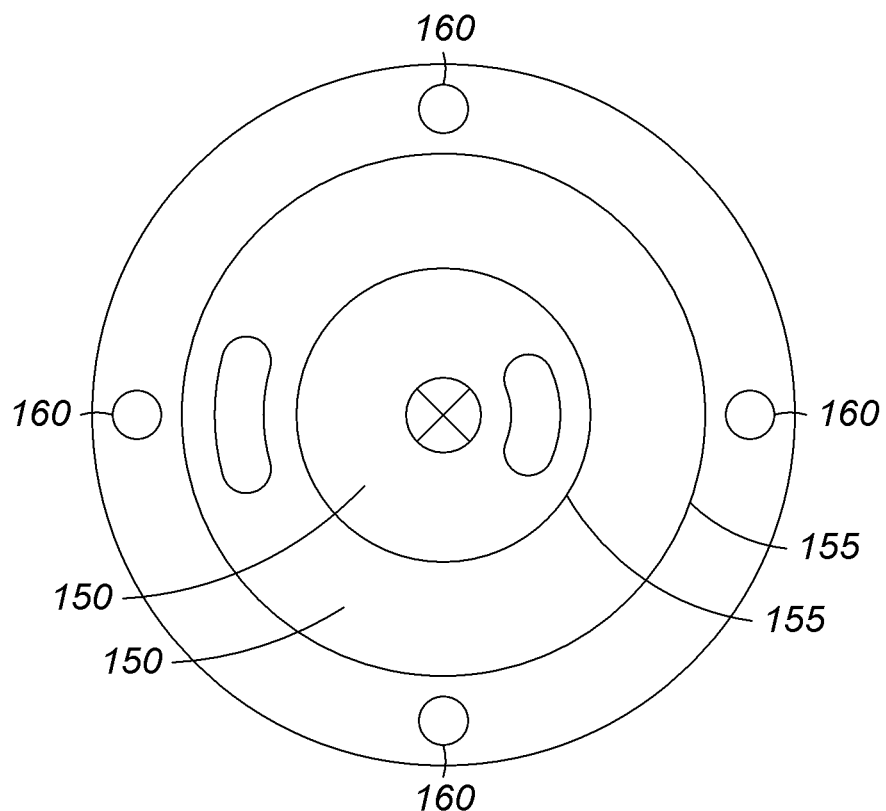
FIG. 4 is an illustration of one embodiment of a track plate.
Figure 5:
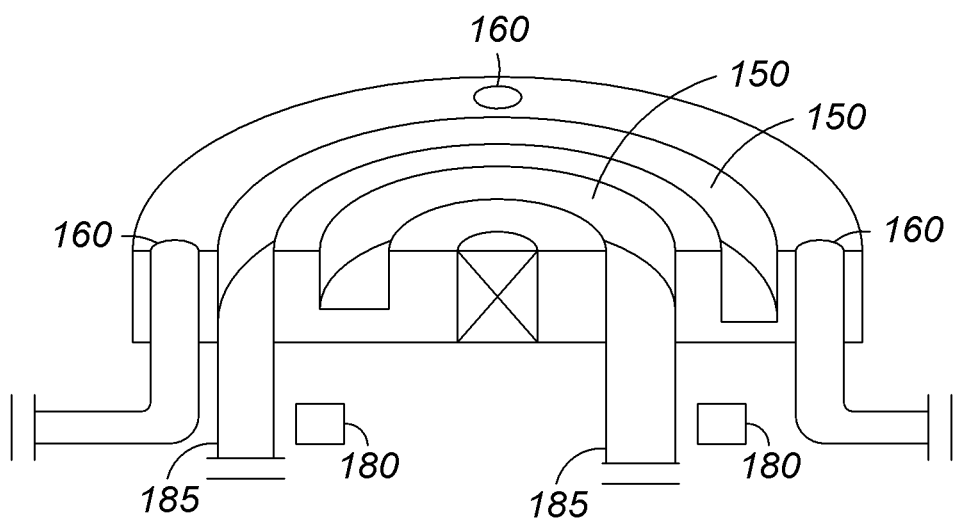
FIG. 5 is a cross-sectional perspective of the embodiment of the track plate of FIG. 4.
Figure 6:
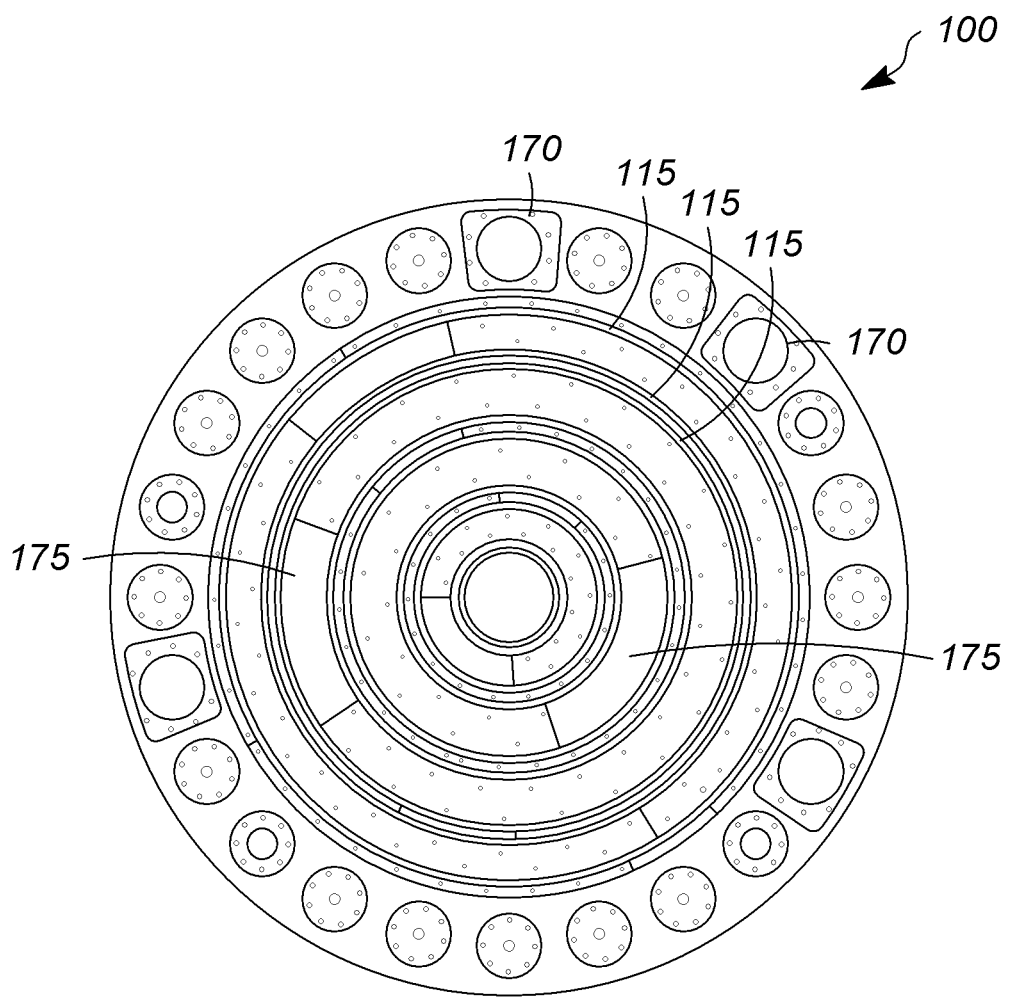
FIG. 6 is an illustration of one embodiment of the bottom of a rotor plate with the seal sheet.

FIGS. 2-6 illustrate one embodiment of a rotary valve. The rotary valve 15 includes two main parts: a moving rotor plate 100 and a stationary track plate 105. The rotor plate 100 is positioned on top of the track plate 105. Both the rotor plate 100 and the track plate 105 are positioned in a pressure containing vessel 110, commonly called a dome. The elastomer seal sheet 115 is secured to the bottom of the rotor plate 100 between the tracks on the track plate 105.

The track plate 105 has a plurality of track walls 155 defining a plurality of tracks 150. The annular area of each track can be determined from the track radius (based on the centerline of the track) and width. The annular area equals the exposed portion of the seal sheet above the track. There are a series of bed line ports 160 surrounding the tracks 150 around the edge of the track plate 105.

The tracks 150 are connected to the bed line ports 160 by crossover lines 165 in the rotor plate 100. The crossover lines 165 connect rotor ports 170 at the outside edge of the rotor plate 100 with rotor track openings 175 that correspond to the different tracks 150 in the track plate 105.

At the first position of the rotor plate 100, the tracks 150 are connected to the bed line ports 160 through the crossover lines 165. When the rotor plate 100 indexes to the next position, the crossover lines 165 connect the tracks to different bed line ports 160. The tracks 150 operate at different pressures based on the position of the rotor plate 100.

Pressure sensors 180 are positioned the external rotary valve track inlet or outlet nozzles 185 to measure the actual pressure in the tracks. The measured pressure can be transmitted to a controller 190 which controls the fluid flow from the dome 110. The measured track pressures are combined with the known track dimensions to determine the force on the bottom of the rotor plate (force=measured pressure of track 1×area of the track 1+measured pressure of track 2×area of the track 2, etc.). The force above the rotor plate is determined (force=dome pressure×rotor plate area inside the dome). The seating force is the difference between the force above the rotor plate and the force on the bottom of the rotor plate. A fixed seating force target is selected. The track pressures are measured for each position of the rotor plate, allowing the dome pressure to be adjusted for each position such that the fixed seating force target is maintained through the entire rotary valve cycle.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing provides those skilled in the art with a description for implementing an exemplary embodiment of the invention. It is understood that various changes may be made in the function and arrangement of elements described in an exemplary embodiment without departing from the scope of the invention as set forth in the appended claims.

What is claimed is:

1. A method of operating a rotary valve for a liquid adsorption process, the rotary valve comprising a stationary track plate and a moving rotor plate, the stationary track plate having a plurality of annular tracks, the method comprising:
    selecting a seating force;
    measuring a pressure in each annular track in the stationary track plate at a first position of a plurality of positions of the rotor plate;
    controlling a pressure on a seal sheet at the first position based on the measured pressure at the first position and the seating force;
    indexing the rotor plate to a next position of the plurality of positions of the rotor plate;
    measuring a pressure in each annular track in the stationary track plate at the next position;
    controlling the pressure on the seal sheet at the next position based on the measured pressure at the next position and the seating force.

2. The method of claim 1 wherein the stationary track plate and the rotor plate are positioned in a dome, and wherein controlling the pressure on the seal sheet at the first position comprises adjusting a pressure in the dome over the rotor plate.

3. The method of claim 1 wherein the stationary track plate and the rotor plate are positioned in a dome, and wherein controlling the pressure on the seal sheet at the next position comprises adjusting a pressure in the dome over the rotor plate.

4. The method of claim 1 further comprising transmitting the measured pressure at the first position to a controller.

5. The method of claim 4 wherein the stationary track plate and the rotor plate are positioned in a dome, and wherein the controller adjusts a pressure in the dome over the rotor plate.

6. The method of claim 1 further comprising transmitting the measured pressure at the next position to a controller.

7. The method of claim 6 wherein the stationary track plate and the rotor plate are positioned in a dome, and wherein the controller adjusts a pressure in a dome over the rotor plate.

8. The method of claim 1 wherein controlling the pressure on the seal sheet at the first position comprises:
    determining a force on a bottom of the rotor plate at the first position from the measured pressure at the first position and an area of each annular track;
    selecting a pressure set point at the first position based on the force at the first position and the seating force.

9. The method of claim 8 wherein the stationary track plate and the rotor plate are positioned in a dome, and wherein controlling the pressure on the seal sheet at the first position further comprises adjusting a pressure in the dome over the rotor plate.

10. The method of claim 8 further comprising transmitting the measured pressure at the first position to a controller.

11. The method of claim 10 wherein the stationary track plate and the rotor plate are positioned in a dome, and wherein the controller adjusts a pressure in the dome over the rotor plate.

12. The method of claim 8 wherein controlling the pressure at the next pressure set point comprises:

determining a force on the bottom of the rotor plate at the next position from the measured pressure at the next position and the area of each annular track;

selecting the pressure set point at the next position based on the force at the next position and the seating force.

13. The method of claim 12 wherein the stationary track plate and the rotor plate are positioned in a dome, and wherein controlling the pressure at the next position further comprises adjusting a pressure in the dome over the rotor plate.

14. The method of claim 12 further comprising transmitting the measured pressure at the next position to a controller.

15. The method of claim 14 wherein the stationary track plate and the rotor plate are positioned in a dome, and wherein the controller adjusts a pressure in the dome over the rotor plate.

16. A method of operating a rotary valve for a liquid adsorption process, the rotary valve comprising a stationary track plate and a moving rotor plate, the stationary plate having a plurality of annular tracks, the method comprising:

selecting a seating force;

measuring a pressure in each annular track in the stationary track plate at a first position of a plurality of positions of the rotor plate;

determining a force on a bottom of the rotor plate at the first position from the measured pressure at the first position and an area of each annular track;

selecting a pressure set point at the first position based on the force at the first position and the seating force;

controlling a pressure on a seal sheet at the pressure set point at the first position;

indexing the rotor plate to a next position;

measuring a pressure of each annular track in the stationary track plate at the next position;

determining a force on the bottom of the rotor plate at the next position from the measured pressure at the next position and the area of each annular track;

selecting a pressure set point at the next position based on the force at the next position and the seating force;

controlling the pressure on the seal sheet at the pressure set point at the next position.

17. The method of claim 16 wherein the stationary track plate and the rotor plate are positioned in a dome, and wherein controlling the pressure at the pressure set point at the first position comprises adjusting a pressure in the dome over the rotor plate.

18. The method of claim 16 wherein the stationary track plate and the rotor plate are positioned in a dome, and wherein controlling the pressure at the pressure set point at the next position comprises adjusting a pressure in the dome over the rotor plate.

19. The method of claim 16 further comprising transmitting the measured pressure at the first position to a controller.

20. The method of claim 16 further comprising transmitting the measured pressure at the next position to a controller.

* * * * *